(12) United States Patent
Wang et al.

(10) Patent No.: US 8,565,270 B2
(45) Date of Patent: Oct. 22, 2013

(54) PHASE AND FREQUENCY RE-LOCK IN SYNCHRONOUS ETHERNET DEVICES

(75) Inventors: Peiqing Wang, Laguna Beach, CA (US); Xiaotong Lin, Saratoga, CA (US); Mehmet Tazebay, Irvine, CA (US); Linghsiao Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 174 days.

(21) Appl. No.: 13/156,228

(22) Filed: Jun. 8, 2011

(65) Prior Publication Data

US 2011/0305173 A1 Dec. 15, 2011

Related U.S. Application Data

(60) Provisional application No. 61/388,106, filed on Sep. 30, 2010, provisional application No. 61/353,261, filed on Jun. 10, 2010.

(51) Int. Cl.
 *H04J 3/06* (2006.01)
(52) U.S. Cl.
 USPC ........... 370/516; 370/506; 370/512; 370/514; 370/520

(58) Field of Classification Search
 USPC ......... 370/503, 505, 506, 509, 512, 514, 516, 370/520
 See application file for complete search history.

(56) References Cited

U.S. PATENT DOCUMENTS

| 5,294,921 A | * | 3/1994 | Hotka et al. ................. 340/3.21 |
| 6,028,853 A | * | 2/2000 | Haartsen ....................... 370/338 |
| 2011/0038283 A1 | * | 2/2011 | Yu et al. ........................ 370/277 |

* cited by examiner

*Primary Examiner* — Ronald Abelson
(74) *Attorney, Agent, or Firm* — Farjami & Farjami LLP (57) ABSTRACT

A first PHY may be coupled to a second PHY via a network link. The first PHY may transition from a role of timing master for the network link to a role of timing slave for the network link. During a first time interval subsequent to the transition, the PHYs may communicate half-duplex over the link while the first PHY synchronizes to a transmit clock of the second PHY. During a second time interval, the PHYs may communicate full-duplex while the second Ethernet PHY synchronizes to a transmit clock of the first PHY. Also during the second time interval, the first PHY may determine that the first PHY and the second PHY are synchronized. Subsequent to the determination, the PHYs may begin full-duplex communication of data on the network link.

20 Claims, 4 Drawing Sheets

PHASE AND FREQUENCY RE-LOCK IN SYNCHRONOUS ETHERNET DEVICES

PRIORITY CLAIM

This patent application makes reference to, claims priority to and claims benefit from:
United States Provisional Patent Application Ser. No. 61/388,106 filed on Sep. 30, 2010; and
United States Provisional Patent Application Ser. No. 61/353,261 filed on Jun. 10, 2010.
Each of the above-stated applications is hereby incorporated herein by reference in its entirety.

INCORPORATION BY REFERENCE

This application also makes reference to: U.S. patent application Ser. No. 13/072,619 filed on Mar. 25, 2011
The above-stated application is hereby incorporated herein in its entirety.

FIELD OF THE INVENTION

Certain embodiments of the invention relate to communication networks. More specifically, certain embodiments of the invention relate a method and system for phase and frequency re-lock in synchronous Ethernet devices.

BACKGROUND OF THE INVENTION

Traditional Ethernet networks typically transmit asynchronous data traffic in which there is no requirement to pass a synchronization signal between devices that are coupled via a data link. In traditional telecommunication networks, there are generally rigorous requirements for synchronization of timing between network devices. In telecommunication networks, network devices are typically synchronized to a common clock. T-carrier systems, such as T-1, E-carrier systems, such as E-1, and optical systems, such as the Synchronous Optical Network (SONET) and the Synchronous Digital Hierarchy (SDH), require timing synchronization between network devices.

Synchronous Ethernet (or sync-E) is a means for achieving synchronous operation among network devices in an Ethernet network. Sync-E utilizes the physical layer interface to communicate clock synchronization between network devices that are coupled via a data link.

In telecommunication networks, timing synchronization is typically based on a multi-level clock hierarchy model. Clock sources that are higher in the clock hierarchy model have more rigorous requirements for high accuracy than clock sources that are lower in the clock hierarchy model. For example, in SONET/SDH networks, at the top of the clock hierarchy model is the primary reference clock (PRC). A given telecommunication network operator will typically maintain a single PRC that is utilized as the common clock for the network.

At the second level of the clock hierarchy model is the building integrated timing supply (BITS). BITS is a method for distributing a clock among network devices. The clock is typically distributed to a given network device via an interface located at that network device. For example, in a T-1 network, BITS may distribute the clock to a network device via a T-1 input interface to the network device, or in a SONET network, BITS may distribute the clock to a network device via an (optical carrier) OC-3 input interface to the network device. When the network device is coupled to a subsequent network device, the network device may communicate the clock via an interface link to the subsequent network device, where the subsequent network device utilizes the clock received via the interface link to enable the two devices to establish synchronized timing. This process of distributing synchronized timing between network devices that are coupled via a common interface link (or loop) is referred to as loop timing. In this case, the network device may recover the clock from the input interface (as distributed by BITS) and communicate the recovered clock via an output interface to the subsequent network device, where the subsequent network device receives the clock output from the network device via an input interface located at the subsequent network device.

The third level of the clock hierarchy model is the synchronous equipment timing source (SETS). SETS is a method for distributing a clock within a network device. A SETS is typically integrated within the network device for which the SETS distributes the clock. A SETS may select a clock source from a plurality of candidate clock sources. In a synchronous network, the SETS will typically select a clock source that is received from the highest available clock source in the clock hierarchy model. Preferably, this clock source is the PRC and may be received at the network device via an input interface. In such case, the SETS will select the appropriate input interface and distribute the clock received via that input interface within the network device. In other cases, the SETS may select a clock source that is internally generated within the network device, typically from a phase locked loop (PLL) that is driven by a crystal oscillator (CXO). This internally generated clock source may also be referred to as a local node clock (LNC). The selected clock source is then distributed by the SETS within the network device.

At various times, the SETS may change, or switch, clock sources.

When clock sources are switched, discontinuities may occur in the frequency and/or phase of clock signals. The corresponding discontinuity may cause a temporary link failure.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for phase and frequency re-lock in synchronous Ethernet devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of a method and system for phase and frequency re-lock in synchronous Ethernet PHYs are provided. In various embodiments of the invention, a first Ethernet PHY may be coupled to a second Ethernet PHY via a network link. The first Ethernet PHY may transition from a role of timing master for the network link to a role of timing slave for the network link. During a first time interval after the transition, the Ethernet PHYs may communicate half-duplex while the first Ethernet PHY synchronizes to a transmit clock of the second Ethernet PHY. For example, the first Ethernet PHY may transmit only zeros onto the network link while receiving IDLE signals via the Network link. Also during the first time interval, the first Ethernet PHY may utilize the received IDLE signals to synchronize one or more circuits of the first Ethernet PHY to a transmit clock of the second Ethernet PHY. During a second time interval, which occurs after the first time interval, the Ethernet PHYs may communicate full-duplex while the second Ethernet PHY synchronizes to a transmit clock of the first Ethernet PHY. For example, the first Ethernet PHY may transmit IDLE symbols onto the network link while concurrently receiving IDLE symbols via the network link. Also during the second time interval, the first Ethernet PHY may determine that the first Ethernet PHY and the second Ethernet PHY are synchronized. After the determination, the first Ethernet PHY may begin communication of data on the network link.

In various embodiments of the invention, a first Ethernet PHY may transition from a role of timing slave for the network link to a role of timing master for the network link. During a first time interval after the transition, the PHYs may communicate half-duplex while the second PHY synchronizes to a transmit clock of the first Ethernet PHY. For example, the first Ethernet PHY may transmit IDLE signals onto the Network link. During a second time interval after the first time interval the PHYs may communicate full-duplex while the first PHY synchronizes to a transmit clock of the second PHY. For example, the first Ethernet PHY may receive IDLE symbols via the network link while concurrently transmitting IDLE symbols onto the network link. Also during the second time interval, the first Ethernet PHY may utilize the IDLE symbols to synchronize a receive clock of the first Ethernet PHY to a transmit clock of the second Ethernet PHY. During the second time interval, the first Ethernet PHY may determine that the first Ethernet PHY and the second Ethernet PHY are synchronized. After the determination, the first Ethernet PHY may begin communication of data on the network link.

The timing role of the first Ethernet PHY, as either timing master or timing slave, may be the same before, during, and after the timing role transition. From a time instant at which the transition is initiated through the beginning of communication of data on the network link, the first Ethernet PHY and the second Ethernet PHY may not enter an autonegotiation mode. That is, the re-lock may occur without the need of autonegotiation. The transition may be initiated in response to a determination to change the primary reference clock to which the first Ethernet PHY and the second Ethernet PHY are to be synchronized. Prior to the transition, the transition may be coordinated via one or more signals communicated between the first Ethernet PHY and the second Ethernet PHY.

Figure 1:
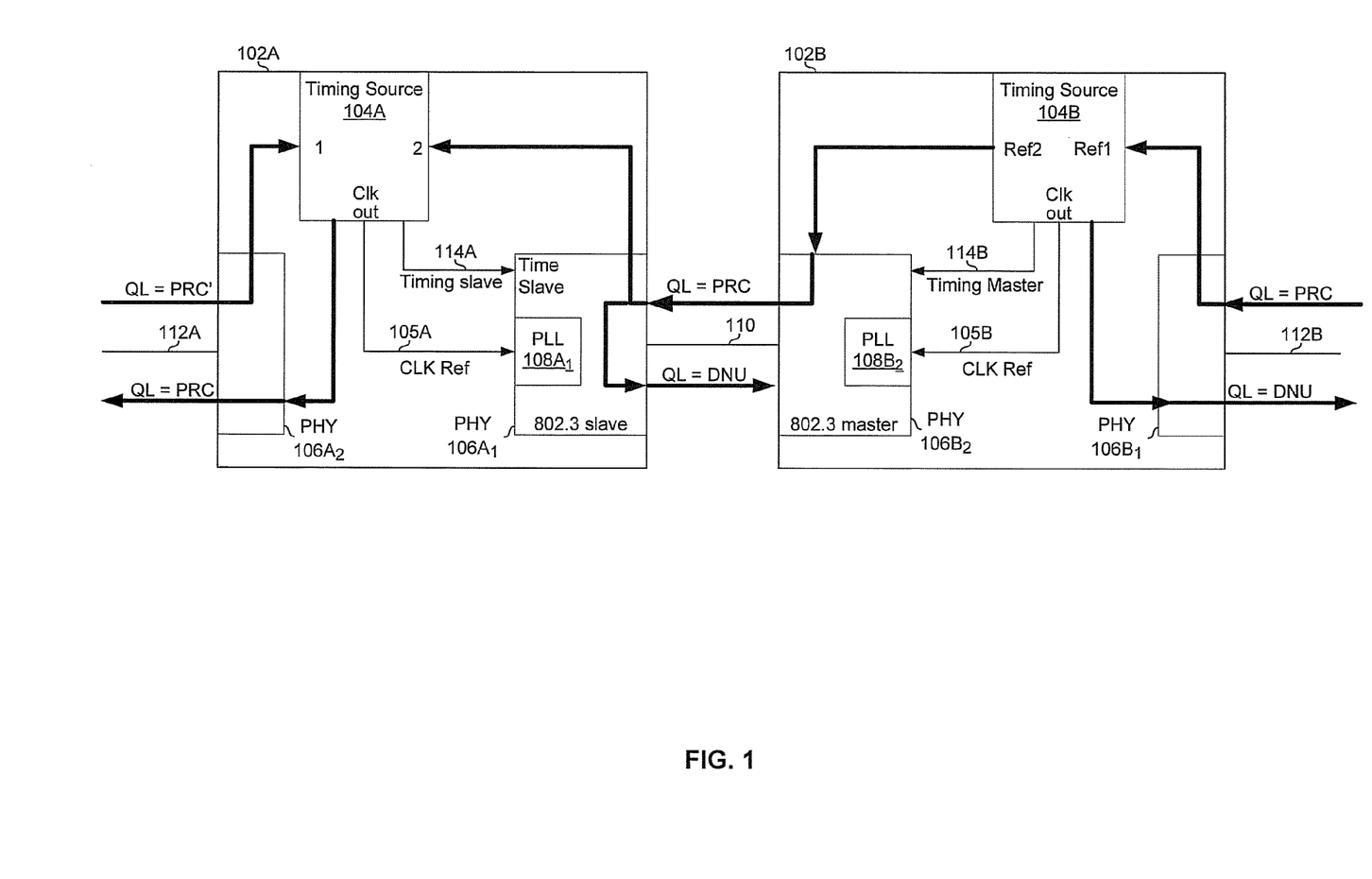
FIGS. 1 and 2 are block diagrams illustrating a pair of network devices operable to switch which device operates as timing master independent of which device operates as IEEE 802.3 master, in accordance with an embodiment of the invention.
Figure 2:
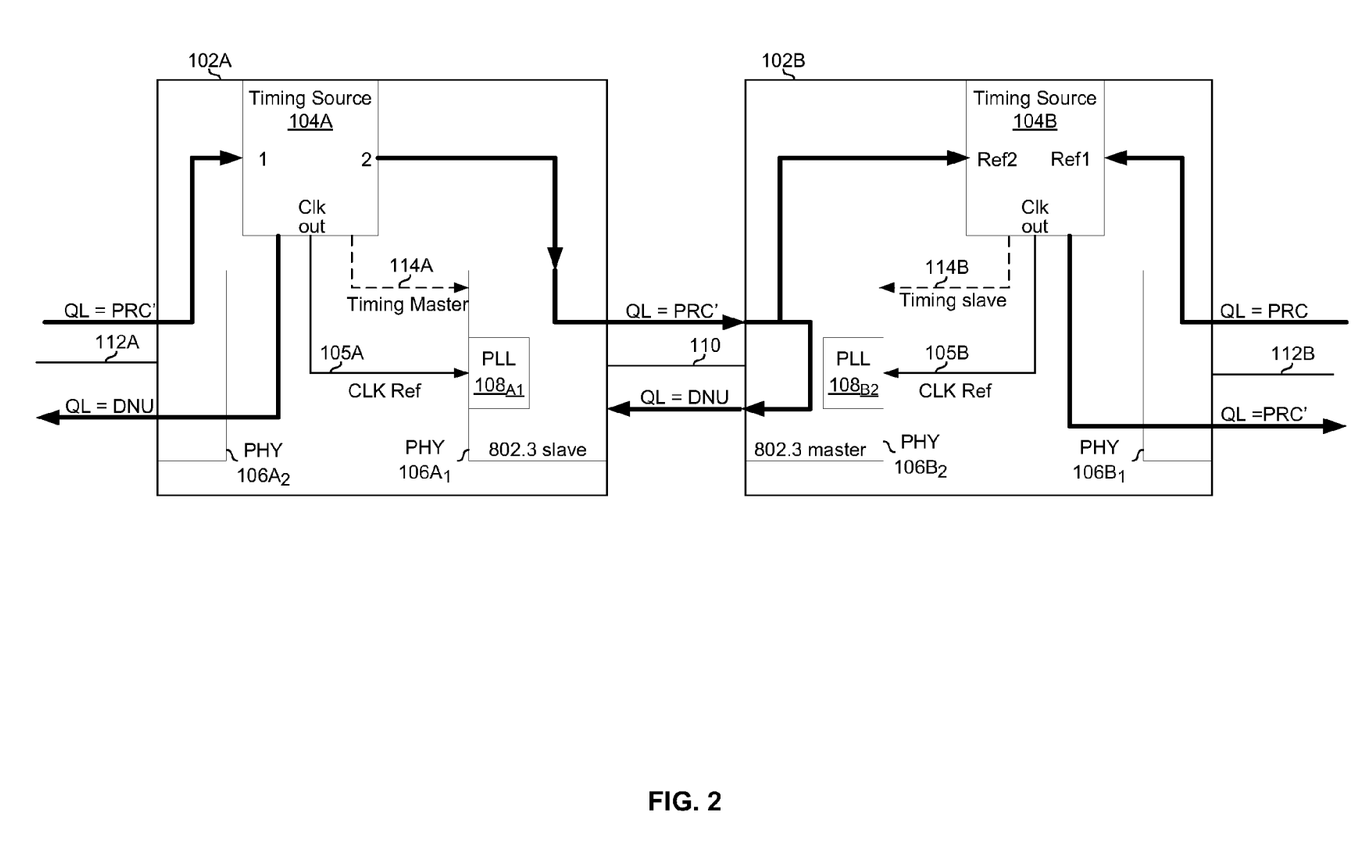

FIGS. 1 and 2 are block diagrams illustrating a pair of network devices operable to switch which device operates as timing master independent of which device operates as IEEE 802.3 master, in accordance with an embodiment of the invention. Referring to FIGS. 1 and 2, there is shown exemplary network devices 102A and 102B between which there is an active Ethernet physical layer (or similar) connection via link 110, where "active" means that communications may commence or continue without having to undergo autonegotiation or other similar connection-establishment routine. The exemplary network device 102A comprises a timing source 104A, and Ethernet PHYs $106A_1$ and $106A_2$. The exemplary network device 102B comprises a timing source 104B, and Ethernet PHYs $106B_1$ and $106B_2$. The timing sources 104A and 104B may each be referred to as a SETS (synchronous equipment timing source).

Each of the PHYs $106A_1$, $106A_2$, $106B_1$, and $106B_2$ may comprise suitable logic, circuitry, interfaces, and/or code that may enable communications in accordance with one or more Ethernet physical layer protocols such as, for example, 10BASE-X, 100BASE-X, 1GBASE-X, 10GBASE-X, 40GBASE-X, and 100GBASE-X, where 'X' is a refers to any of the various physical media types set forth in the IEEE 802.3 standard. Each of the PHYs $106A_1$, $106A_2$, $106B_1$, and $106B_2$ may comprise a PLL 108, or other clock generator, that may be utilized for transmission and reception of data. For synchronous Ethernet communications, the PLL 108 may be phase and/or frequency locked to the clock signal 105.

The timing source 104A may comprise suitable logic, circuitry, interfaces, and/or code that may be operable to perform various functions for supporting synchronous Ethernet communications. Exemplary functions may comprise clock generation and synchronization. The timing source 104A may operate at OSI layer 2 and/or higher OSI layers. The timing source 104A may generate a clock 105A which may be provided to the PHYs $106A_1$ and $106A_2$. The timing source 104A may be operable to synchronize the phase and/or frequency of the clock 105A to a selected reference clock. The selected reference clock may be dynamically selected from a plurality of available reference clocks. The selected reference clock may be selected in a manner that is transparent to the PHYs $106A_1$ and $106A_2$. For example, for PHYs $106A_1$ and $106A_2$ configured to communicate compliant with 100/1G/10GBASE-T, a change in selected reference clock may be done without the PHYs $106A_1$ and $106A_2$ losing their active physical Ethernet layer connection ("losing link-up") with their respective link partners. Thus, a change in the selected reference clock may occur without the network devices having to re-enter autonegotiation for communications over the link 110. To synchronize clock 105A to a first reference clock, PRC, the timing source 104A may utilize synchronization information received via the PHY $106A_1$. To synchronize clock 105A to a second reference clock, PRC', the timing source 104A may utilize synchronization information received via the PHY $106A_2$. The timing source 104A may be operable to output an indication of the selected reference clock to the PHYs $106A_1$ and $106A_2$. The timing source 104B may be substantially similar to the timing source 104A.

In operation of an exemplary embodiment of the invention, referring to FIG. 1, the PHYs $106A_1$ and $106B_2$ may be connected via the link 110 and may enter autonegotiation, or an equivalent procedure, to configure speed, duplex mode, and master/slave configuration. For purposes of illustration, it is assumed that the PHY $106A_1$ is configured to be the IEEE 802.3 slave and PHY $106B_2$ is configured to be the IEEE 802.3 master. A timing master may also be assigned during autonegotiation or shortly thereafter. In various embodiments of the invention, the initial timing master may be selected, for example, to be the IEEE 802.3 master, to be the IEEE 802.3 slave, or may be selected randomly or based on some other parameter such as a network address. For purposes of illustration, it may be assumed that the PHYs $106A_2$ and $106B_1$ have active Ethernet physical layer connections to their respective link partners (not shown) via links 112A and 112B, respectively.

After a Ethernet physical layer connection is established between PHYs $106A_1$ and $106B_2$, normal data and/or IDLE symbols generated utilizing a first encoding corresponding to a first set of one or more PCS code-groups may be communicated over the link 110. These communications may include Ethernet Synchronization Message Channel (ESMC) messages, which may similarly be communicated over the link 112A and the link112B. The timing sources 104A and 104B may each utilize the ESMC messages in selecting a reference clock to which the clocks 105A and 105B, respectively, are synchronized.

In FIG. 1, the reference clock PRC, which reaches the network device 102B via the PHY $106B_1$, is the selected reference clock. Consequently, for the connection between the network device 102A and 102B, the network device 102B is configured as timing master and the network device 102A is configured as the timing slave. Timing source 104A indicates network device 102A's designation as timing slave to the PHY $106A_1$ via the signal 114A. Similarly, the timing source 104B indicates network device 102B's designation as timing slave to the PHY $106_{B2}$ via the signal 114B.

In FIG. 2, the reference clock PRC', which reaches the network device 102A via the PHY $106A_2$, is the selected reference clock. Consequently, for the connection between the network device 102A and 102B, the network device 102A is configured as timing master and the network device 102B is configured as the timing slave. Timing source 104A indicates network device 102A's designation as timing master to the PHY $106A_1$ via the signal 114A. Similarly, timing source 104B indicates network device 102B's designation as timing master to the PHY $106_{B2}$ via the signal 114B. In FIG. 2, the network device 102A remains IEEE 802.3 slave and network device 102B remains IEEE 802.3 master, despite the switched timing roles.

Aspects of the invention enable transitioning from the configuration depicted in FIG. 1 to the configuration depicted in FIG. 2, without tearing down the Ethernet physical layer connection between network devices 102A and 102B. Furthermore, aspects of the invention may enable transitioning from the configuration depicted in FIG. 1 to the configuration in FIG. 2 while reducing or eliminating discontinuities in clock phase and/or frequency.

Certain embodiments of the invention may be found in a two-step phase and frequency relock mechanism. Various embodiments of the invention comprise a method and system for a two-step phase and frequency relock mechanism. In various embodiments of the invention, the two-step phase and frequency relock mechanism enables a synchronous equipment timing source (SETS) to switch clock sources while avoiding the resultant frequency and/or phase discontinuities in loop timing that may occur in conventional synchronous Ethernet (sync-E) networks.

In various embodiments of the invention, the two-step phase and frequency relock mechanism may be practiced when two network devices switch their timing roles. In various embodiments of the invention, the two-step phase and frequency relock mechanism may be initiated based on signaling from a SETS. The first step of the two-step phase and frequency relock mechanism, involves half duplex communication between network devices that are communicatively coupled via a link. During the half duplex communication, the device that is transitioning to the role of timing master (the "new timing master"), may send synchronization signals via a link to the device that is transitioning to the role of timing slave (the "new timing slave"). The synchronization signals may communicate timing synchronization information. While the new timing master sends synchronization signals, the new timing slave may transmit nothing but zeros. That is, the transmitter of the new slave may be on but may remain silent.

In various embodiments of the invention, the new timing slave, e.g., the device 104A in FIG. 2, may utilize the received synchronization signals to acquire timing frequency and/or phase synchronization. The PHY within the new timing slave that is coupled to the link, for example the PHY $106A_1$ in FIG. 2, may attempt to phase and/or frequency lock a PHY layer scrambler and/or other circuitry in the PHY based on the received synchronization signals. The timing slave may determine when the scrambler and/or other circuitry has detected a lock condition, and utilize this determination to identify when loop timing frequency and/or phase synchronization has been acquired by the new timing slave. The new timing slave may communicate, to the new timing master, via the link, a status indication that loop timing frequency and/or phase synchronization has been acquired at the new timing slave.

The second step of the two-step phase and frequency relock mechanism, involves full duplex communication, via the link, between the new timing master and new timing slave. During the full duplex communication, the new timing slave, for example the network device 102B in FIG. 2, may commence the sending of synchronization signals via the link to the new timing master while the new timing master may continue to send synchronization signals to the new timing slave. In various embodiments of the invention, the new timing master utilize the received synchronization signals to acquire loop timing frequency and/or phase synchronization via the link. The PHY layer interface within the new timing master that is coupled to the link, for example the PHY 106B2 in FIG. 2, may attempt to lock a scrambler and/or other circuitry in the PHY based on the received synchronization signals. The new timing master may determine when the scrambler and/or other circuitry has detected a lock condition, and utilize this determination to identify when loop timing frequency and/or phase synchronization has been acquired by the new timing master. The new timing master may communicate, to the new timing slave via the link, a status indication that loop timing frequency and/or phase synchronization has been acquired at the new timing master. Subsequent to the communication of this indication, the new timing master and new timing slave may determine that loop timing synchronization has been acquired via the link and the new timing master and new timing slave may commence communication of data via the link.

Figure 3:
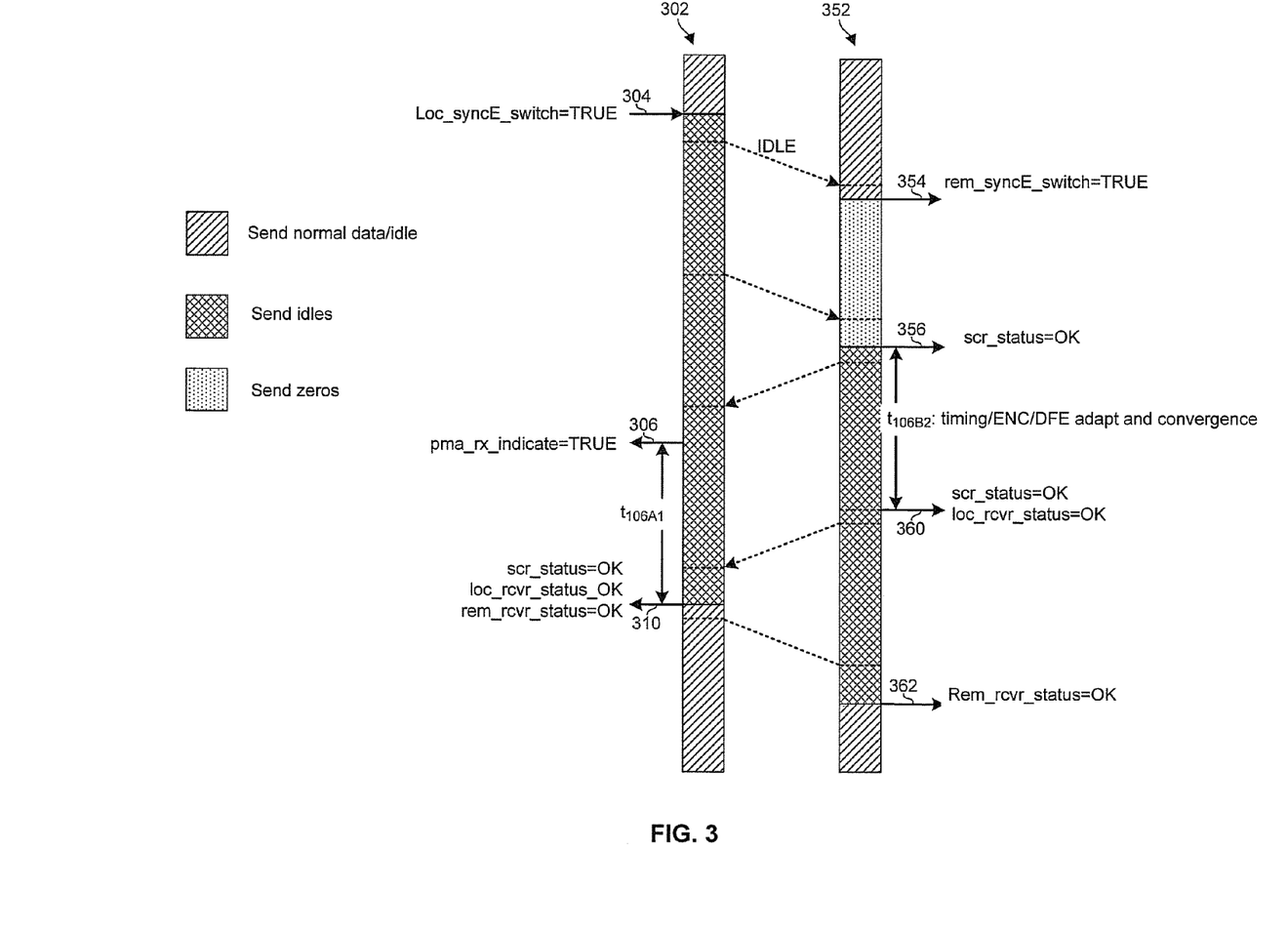
FIG. 3 is a diagram illustrating a two-step phase and frequency relock mechanism, in accordance with an embodiment of the invention.

FIG. 3 is a diagram illustrating a two-step phase and frequency relock mechanism, in accordance with an embodiment of the invention. FIG. 3 presents a two-step phase and frequency relock mechanism that enables a transition from the clock synchronization configuration, as presented in FIG. 1, to the clock synchronization configuration, as presented in FIG. 2. Various embodiments of the invention may also enable a transition from the clock synchronization configuration, as presented in FIG. 2, to the clock synchronization configuration, as presented in FIG. 1. In various embodiments of the invention, the transition of clock synchronization configurations may be achieved while avoiding transient discontinuities in clock frequency and/or phase that could cause communication errors over the link 110.

Referring to FIG. 3, column 302 refers to signals communicated by the network device 102A to the network device 102B via link 110 while column 352 refers to signals communicated by the network device 102B to the network device 102A via link 110. At time 304, the timing source 104A may determine to switch clock sources. For example, the timing source 104A may determine to switch from the clock source PRC to the clock source PRC'. The timing source 104A may generate a signal, loc_syncE_switch=TRUE, which indicates that the timing source 104A is initiating a clock source switch. The signal, loc_syncE_switch=TRUE, may be communicated to the PHY $106A_1$. Based on receipt of the signal loc_syncE_switch=TRUE, the PHY $106A_1$ may determine that its role on link 110 is to switch from timing slave to timing master, even though it may remain as an 802.3 slave. The PHY $106A_1$ may transmit the signal loc_syncE_switch=TRUE, to the network device 102B via link 110. Subsequent to transmitting loc_syncE_switch=TRUE, the PHY $106A_1$ may begin transmitting synchronization signals via link 110. In an exemplary embodiment of the invention, as shown in FIG. 3, the synchronization signals may be IDLE signals.

Based on receipt of loc_syncE_switch=TRUE from the PHY $106A_1$, PHY $106B_2$ may determine that its role on the link 110 is to switch from timing master to timing slave, even though it may remain as an 802.3 master. At time 354, based on receipt of loc_syncE_switch=TRUE from the PHY $106A_1$, PHY $106B_2$ may generate a corresponding signal, rem_syncE_switch=TRUE, and communicate rem_syncE_switch=TRUE to the timing source 104B. In response to rem_syncE_switch=TRUE, timing source 104B may cease utilizing reference clock PRC received via PHY $106B_1$ and may instead utilize reference clock PRC' received via PHY $106B_2$. Subsequent to transmitting the signal, rem_syncE_switch=TRUE, to the timing source 104B, the PHY $106B_2$ may begin sending only zeros via the link 110. That is, the PHY $106B_2$ may silence its transmitter. The transmission of IDLE signals from the PHY $106A_1$, via link 110, while the transmitter of the PHY $106B_2$ remains silent is referred to as half-duplex communication on the link 110.

While the transmitter of the PHY $106B_2$ is silent during the half-duplex phase, the scrambler and/or other circuitry of the PHY $106B_2$ may attempt to achieve a phase and/or frequency lock condition based on IDLE signals received via the link 110. The lock condition may enable the PHY $106B_2$ to determine that it has synchronized to the frame boundary of protocol data units (PDUs) that are transmitted by the PHY $106A_1$ based on the IDLE signals. In an exemplary embodiment of the invention, the scrambler and/or other circuitry of the PHY $106B_2$ may achieve the lock condition utilizing header information contained within the PHY layer PDUs (PPDUs).

Upon determining that its scrambler and/or other circuitry has achieved phase and/or frequency lock the PHY $106B_2$ may generate a signal, scr_status=OK. the PHY $106B_2$ may then transmit the signal scr_status=OK to the PHY $106A_1$ via link 110. Subsequent to transmitting scr_status=OK, the PHY $106B_2$, at time 356, may begin transmitting IDLE signals, via the link 110, to the PHY $106A_1$. From time 356 to time 360, the PHY $106B_2$ may attempt to acquire loop timing frequency and/or phase synchronization based on IDLE signals received via link 110. The interval between time 356 and time 360 is referenced in FIG. 3 as $t_{106B2}$. The transmission of IDLE signals by both the PHY $106A_1$ and the PHY $106B_2$ is referred to as full-duplex communication on link 110.

Upon receiving scr_status=OK from PHY $106B_2$, PHY $106A_1$ may, at time 306, generate a signal, pma_rx_indicate=TRUE. The signal pma_rx_indicate=TRUE may indicate to the timing source 104A that a scrambler and/or other circuitry of the PHY $106B_2$ has achieved a lock condition. The signal pma_rx_indicate=TRUE may also indicate that receipt of IDLE signals at the PHY $106A_1$ via the link 110, is anticipated. From time 306 to time 310, the PHY $106A_1$ may attempt to acquire loop timing frequency and/or phase synchronization based on IDLE signals received at the PHY $106A_1$ via link 110. The interval between time 306 and time 310 is referenced in FIG. 3 as $t_{106A1}$.

Upon completion of the interval $t_{106B2}$, the PHY $106B_2$ may determine that loop timing frequency and/or phase synchronization has been acquired for link 110. Based on this determination, at time 360, PHY $106B_2$ may generate a signal loc_rcvr_status=OK. In addition, the PHY $106B_2$ may generate a signal, scr_status=OK, to indicate that the scrambler lock condition has been maintained. The PHY $106B_2$ may transmit the signals, loc_rcvr_status=OK and scr_status=OK, to network device 102A, via link 110.

Based on receipt of loc_rcvr_status=OK and scr_status=OK from the PHY $106_{B2}$, the PHY $106A_1$ may, at time 310, generate signals scr_status=TRUE and rem_rcvr_status=OK to indicate to timing source 104A that a lock condition has been maintained at the PHY $106B_2$ and/or that the PHY $106B_2$ has acquired loop timing frequency and/or phase synchronization for link110. The PHY $106A_1$ may generate a signal, indicated as loc_rcvr_status=OK to indicate that loop timing frequency and/or phase synchronization for link 110 has also been achieved in the PHY $106A_1$. the PHY $106A_1$ may transmit the signal, loc_rcvr_status=OK, to the network device 102B, via link 110. Thus, at time 310, the PHY $106A_1$ has determined that bidirectional loop timing frequency and/or phase synchronization has been acquired for the link 110. Accordingly, the network device 102A may resume transmission of data via the link 110.

Based on receipt of the signal loc_rcvr_status=OK from the PHY $106A_1$, the PHY $106B_2$ may determine that bidirectional loop timing frequency and/or phase synchronization has been achieved for the link 110. In response, at time 362, the PHY $106B_2$ may generate a signal rem_rcvr_status=0K to indicate to the timing source 104B that the PHY $106A_1$ has achieved loop timing frequency and/or phase synchronization for link 110. Thus, at time 362, the PHY $106B_2$ has determined that bidirectional loop timing frequency and/or phase synchronization has been acquired for the link 110. Accordingly, the network device 102B may resume transmission of data via the link 110.

Figure 4:
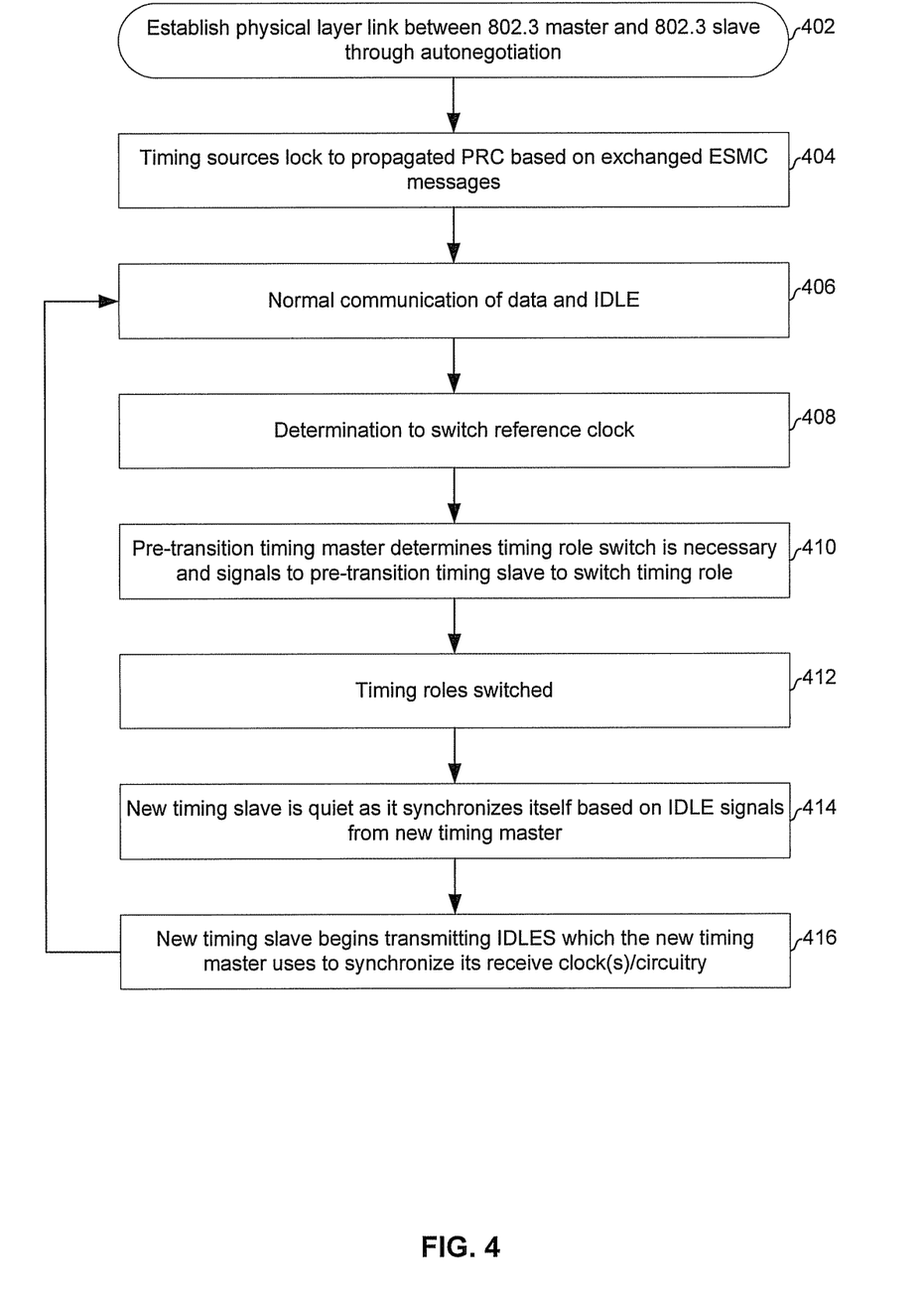
FIG. 4 is a flow chart illustrating exemplary steps for phase and frequency synchronization for synchronous Ethernet, in accordance with an embodiment of the invention.

FIG. 4 is a flow chart illustrating exemplary steps of a two-step phase and frequency synchronization for synchronous Ethernet, in accordance with an embodiment of the invention. Referring to FIG. 4, the exemplary steps may begin with step 402 in which an Ethernet physical layer connection may be established between PHYs $106A_1$ and $106B_2$. For example, step 402 may comprise autonegotiation. During connection establishment it may be decided which one of the PHYs $106A_1$ and $106B_2$ will be configured as IEEE 802.3 master and which one will be configured as IEEE 802.3 slave. In an embodiment of the invention, it may be separately determined, during connection establishment, which one of the PHYs $106A_1$ and $106B_2$ will be configured as timing master for synchronous communications and which one will be configured as timing slave. In an embodiment of the invention, the PHY selected as IEEE 802.3 master may be the default initial timing master. For illustration, it is assumed the PHY 106B₂ is initially the timing master.

In step 404, communications may begin over the link 110 via the connection established in step 402. The communications may include Ethernet Synchronization Message Channel (ESMC) messages. The timing source 104B may synchronize to PRC and the device 102B may send ESMC messages to the device 102A to enable the timing source 104A to synchronize to PRC.

In step 406, normal communication of data and IDLE may take place on the link 110. The ESMC messages may continue to be communicated between the devices 102A and 102B and between the devices 102A and 102B and their respective link partners.

In step 408, based on the ESMC messages, or based on some other parameter or indication, such as request by a network administrator or a loss of the clock PRC, the timing source 104A may decide to change the reference clock from PRC to PRC'. The timing source 104A may communicate an indication of this decision to the PHY 106A₁.

In step 410, in response to the indication from the timing source 104A, the PHY 106A₁ may determine that the timing roles of the PHY 106A₁ and the 106B₂ need to be reversed in order to effect the change in reference clock from PRC to PRC'. Accordingly, the PHY 106A₁ may send a signal to the PHY 106B₂ to trigger the PHY 106B₂ to transition from timing master to timing slave.

In step 412, the PHY 106A₁ may assume the role of timing master, while maintaining its role as 802.3 slave, and the PHY 106B₂ may assume the role of timing slave while maintaining its role as 802.3 master.

In step 414, the PHY 106B₂ may silence its transmitter while receiving IDLE signals transmitted by the PHY 106A₁. The PHY 106B₂ may utilize the received IDLE signals to synchronize is transmit and/or receive clocks and/or other circuitry to the transmit clock of the PHY 106A₁. After a phase and/or frequency lock is achieved by the PHY 106A₁, the exemplary steps may advance to step 416.

In step 416, the PHY 106B₂ may begin transmitting IDLE signals to the PHY 106A₁. The PHY 106A₁ may utilize the IDLE signals from the PHY 106B₂ to synchronize a receive clock and/or other circuitry to the transmit clock of the PHY 106B₂. In some instances, the receive clock of PHY 106A₁ may already be synchronized to the transmit clock of 106A₁. Therefore, if the PHY 106B₂ has accurately synchronized to the transmit clock of the PHY 106A₁, this synchronizing in step 416 may proceed very quickly and may effectively be a verification that the PHY 106B₂ has locked to the transmit clock of the PHY 106A₁.

Certain embodiments of a method and system for phase and frequency re-lock in synchronous Ethernet PHYs are provided. In various embodiments of the invention, a first Ethernet PHY 106B₂ may be coupled to a second Ethernet PHY 106A₁ via a network link 110. The first Ethernet PHY 106B₂ may transition from a role of a timing master for the network link 110 to a role of a timing slave for the network link 110. During a first time interval after the transition, the Ethernet PHYs 106A₁ and 106B₂ may communicate half-duplex while the first Ethernet PHY 106B₂ synchronizes to a transmit clock of the second Ethernet PHY 106A₁. For example, the first Ethernet PHY 106B₂ may transmit only zeros onto the network link 110 while receiving IDLE signals via the network link 110. Also during the first time interval, the first Ethernet PHY 106B₂ may utilize the received IDLE signals to synchronize one or more circuits of the first Ethernet PHY 106B₂ to a transmit clock of the second Ethernet PHY 106A₁. During a second time interval after the first time interval, the Ethernet PHYs 106A₁ and 106B₂ may communicate full-duplex while the second Ethernet PHY 106A₁ synchronizes to a transmit clock of the first Ethernet PHY 106B₂. For example, the first Ethernet PHY 106B₂ may transmit IDLE symbols onto the network link 110 while concurrently receiving IDLE symbols via the network link 110. Also during the second time interval, the first Ethernet PHY 106B₂ may determine that the first Ethernet PHY 106B₂ and the second Ethernet PHY 106A₁ are synchronized. After the determination, the first Ethernet PHY 106B₂ may begin communication of data on the network link 110.

In various embodiments of the invention, a first Ethernet PHY 106A₁ may transition from a role of timing slave for the network link to a role of timing master for the network link. During a first time interval after the transition, the Ethernet PHYs 106A₁ and 106B₂ may communicate half-duplex while the second PHY 106B₂ synchronizes to a transmit clock of the first Ethernet PHY 106A₁. For example, the first Ethernet PHY 106A₁ may transmit IDLE signals onto the Network link 110. During a second time interval after the first time interval the Ethernet PHYs 106A₁ and 106B₂ may communicate full-duplex while the first PHY 106A₁ synchronizes to a transmit clock of the second Ethernet PHY 106B₂. For example, the first Ethernet PHY 106A₁ may receive IDLE symbols via the network link 110 while concurrently transmitting IDLE symbols onto the network link 110. Also during the second time interval, the first Ethernet PHY 106A₁ may utilize the IDLE symbols to synchronize a receive clock of the first Ethernet PHY 106A₁ to a transmit clock of the second Ethernet PHY 106B₂. During the second time interval, the first Ethernet PHY 106A₁ may determine that the first Ethernet PHY 106A₁ and the second Ethernet PHY 106B₂ are synchronized. After the determination, the first Ethernet PHY 106A₁ may begin communication of data on the network link.

The timing role of the first Ethernet PHY 106B₂, as either the timing master or the timing slave, may be the same before, during, and after the timing role transition. From a time instant at which the transition is initiated through the beginning of communication of data on the network link 110, the first Ethernet PHY 106B₂ and the second Ethernet PHY 106A₁ may not enter an autonegotiation mode. That is, the re-lock may occur without the need for autonegotiation. The transition may be initiated in response to a determination to change the primary reference clock to which the first Ethernet PHY 106B₂ and the second Ethernet PHY 106A₁ are to be synchronized. Prior to the transition, the transition may be coordinated via one or more signals communicated between the first Ethernet PHY 106B₂ and the second Ethernet PHY 106A₁.

Another embodiment of the invention may provide a non-transitory computer readable medium, having stored thereon, a computer program having at least one code section executable by a computer, thereby causing the computer to perform the steps as described herein for a two-step phase and frequency relock mechanism.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
in a first Ethernet PHY that is coupled to a second Ethernet PHY via a network link:
transitioning from a role of timing master for said network link to a role of timing slave for said network link;
during a first time interval after said transitioning, synchronizing one or more circuits of said first Ethernet PHY to a transmit clock of said second Ethernet PHY, wherein communications on said network link are half-duplex during said first time interval; and
during a second time interval after said first time interval, determining that said first Ethernet PHY and said second Ethernet PHY have achieved synchronization, wherein communications on said network link are full-duplex during said second time interval;
wherein, during said first time interval, said first Ethernet PHY transmits only zeros onto said network link while receiving IDLE signals via said network link.

2. The method according to claim 1, wherein said transitioning is initiated in response to a determination to change the primary reference clock to which said first Ethernet PHY and said second Ethernet PHY are to be synchronized.

3. The method according to claim 1, wherein a role of said first Ethernet PHY as either 802.3 master or 802.3 slave is the same before, during, and after said transitioning.

4. The method according to claim 1, wherein:
after said second time interval, said first Ethernet PHY begins communicating data on said link; and
from a time instant at which said transitioning is initiated through said beginning of said data communication on said network link, said first Ethernet PHY and said second Ethernet PHY do not enter an autonegotiation mode.

5. A method comprising:
in a first Ethernet PHY that is coupled to a second Ethernet PHY via a network link:
transitioning from a role of timing master for said network link to a role of timing slave for said network link;
during a first time interval after said transitioning, synchronizing one or more circuits of said first Ethernet PHY to a transmit clock of said second Ethernet PHY, wherein communications on said network link are half-duplex during said first time interval; and
during a second time interval after said first time interval, determining that said first Ethernet PHY and said second Ethernet PHY have achieved synchronization, wherein communications on said network link are full-duplex during said second time interval;
wherein said transitioning is initiated in response to a determination to change the primary reference clock to which said first Ethernet PHY and said second Ethernet PHY are to be synchronized.

6. A method comprising:
in a first Ethernet PHY that is coupled to a second Ethernet PHY via a network link:
transitioning from a role of timing slave for said network link to a role of timing master for said network link;
during a first time interval after said transitioning, communicating half-duplex over said network link, during a second time interval after said first time interval, synchronizing one or more circuits of first Ethernet PHY to a transmit clock of said second Ethernet PHY, and
during said second time interval, determining that said first Ethernet PHY and said second Ethernet PHY have achieved synchronization, wherein communications on said network link are full-duplex during said second time interval;
wherein, during said first time interval, said first Ethernet PHY transmits only zeros onto said network link while receiving IDLE signals via said network link.

7. The method according to claim 6, wherein said transitioning is initiated in response to a determination to change the primary reference clock to which said first Ethernet PHY and said second Ethernet PHY are to be synchronized.

8. The method according to claim 6, wherein a role of said first Ethernet PHY as either 802.3 master or 802.3 slave is the same before, during, and after said transitioning.

9. The method according to claim 6, wherein:
subsequent to said second time interval, said first Ethernet PHY begins communicating data on said link; and
from a time instant at which said transitioning is initiated through said beginning of said data communication on said network link, said first Ethernet PHY and said second Ethernet PHY do not enter an autonegotiation mode.

10. A method comprising:
in a first Ethernet PHY that is coupled to a second Ethernet PHY via a network link:
transitioning from a role of timing slave for said network link to a role of timing master for said network link;
during a first time interval after said transitioning, communicating half-duplex over said network link,
during a second time interval after said first time interval, synchronizing one or more circuits of first Ethernet PHY to a transmit clock of said second Ethernet PHY, and
during said second time interval, determining that said first Ethernet PHY and said second Ethernet PHY have achieved synchronization, wherein communications on said network link are full-duplex during said second time interval;
wherein said transitioning is initiated in response to a determination to change the primary reference clock to which said first Ethernet PHY and said second Ethernet PHY are to be synchronized.

11. A system comprising:
a first Ethernet PHY, said first Ethernet PHY being coupled to a second Ethernet PHY via a network link, and said first Ethernet PHY being operable to:
transition from a role of timing master for said network link to a role of timing slave for said network link;

during a first time interval after said transitioning, synchronizing one or more circuits of said first Ethernet PHY to a transmit clock of said second Ethernet PHY, wherein communications on said network link are half-duplex during said first time interval;

during a second time interval after said first time interval, determine that said first Ethernet PHY and said second Ethernet PHY have achieved synchronization, wherein communications on said network link are full-duplex during said second time interval;

wherein, during said first time interval, said first Ethernet PHY transmits only zeros onto said network link while receiving IDLE signals via said network link.

12. The system according to claim 11, wherein said transition is initiated in response to a determination to change the primary reference clock to which said first Ethernet PHY and said second Ethernet PHY are to be synchronized.

13. The system according to claim 11, wherein a role of said first Ethernet PHY as either 802.3 master or 802.3 slave is the same before, during, and after said transitioning.

14. The system according to claim 11, wherein:

after said second time interval, said first Ethernet PHY begins communicating data on said link; and from a time instant at which said transition is initiated through said beginning of said data communication on said network link, said first Ethernet PHY and said second Ethernet PHY do not enter an autonegotiation mode.

15. A system comprising:

a first Ethernet PHY, said first Ethernet PHY being coupled to a second Ethernet PHY via a network link, and said first Ethernet PHY being operable to:

transition from a role of timing master for said network link to a role of timing slave for said network link;

during a first time interval after said transitioning, synchronizing one or more circuits of said first Ethernet PHY to a transmit clock of said second Ethernet PHY, wherein communications on said network link are half-duplex during said first time interval;

during a second time interval after said first time interval, determine that said first Ethernet PHY and said second Ethernet PHY have achieved synchronization, wherein communications on said network link are full-duplex during said second time interval;

wherein said transition is initiated in response to a determination to change the primary reference clock to which said first Ethernet PHY and said second Ethernet PHY are to be synchronized.

16. A system comprising:

a first Ethernet PHY, said first Ethernet PHY being coupled to a second Ethernet PHY via a network link, and said first Ethernet PHY being operable to:

transition from a role of timing slave for said network link to a role of timing master for said network link;

during a first time interval after said transitioning, communicating half-duplex over said network link, during a second time interval after said first time interval, synchronize one or more circuits of said first Ethernet PHY to a transmit clock of said second Ethernet PHY; and during said second time interval, determine that said first Ethernet PHY and said second Ethernet PHY have achieved synchronization, wherein communications on said network link are full-duplex during said second time interval;

wherein, during said first time interval, said first Ethernet PHY transmits only zeros onto said network link while receiving IDLE signals via said network link.

17. The system according to claim 16, wherein said transition is initiated in response to a determination to change the primary reference clock to which said first Ethernet PHY and said second Ethernet PHY are to be synchronized.

18. The system according to claim 16, wherein a role of said first Ethernet PHY as either 802.3 master or 802.3 slave is the same before, during, and after said transitioning.

19. The system according to claim 16, wherein:

subsequent to said second time interval, said first Ethernet PHY begins communicating data on said link; and from a time instant at which said transitioning is initiated through said beginning of said data communication on said network link, said first Ethernet PHY and said second Ethernet PHY do not enter an autonegotiation mode.

20. A system comprising:

a first Ethernet PHY, said first Ethernet PHY being coupled to a second Ethernet PHY via a network link, and said first Ethernet PHY being operable to:

transition from a role of timing slave for said network link to a role of timing master for said network link;

during a first time interval after said transitioning, communicating half-duplex over said network link, during a second time interval after said first time interval, synchronize one or more circuits of said first Ethernet PHY to a transmit clock of said second Ethernet PHY; and during said second time interval, determine that said first Ethernet PHY and said second Ethernet PHY have achieved synchronization, wherein communications on said network link are full-duplex during said second time interval;

wherein said transition is initiated in response to a determination to change the primary reference clock to which said first Ethernet PHY and said second Ethernet PHY are to be synchronized.

* * * * *